US012487785B2

(12) United States Patent
Ishii

(10) Patent No.: US 12,487,785 B2
(45) Date of Patent: Dec. 2, 2025

(54) INFORMATION PROCESSING DEVICE, DISPLAY SYSTEM, AND INFORMATION PROCESSING METHOD FOR DISPLAYING VIEWER-LATENT-INTEREST-BASED CONTENT

(71) Applicant: Sharp NEC Display Solutions, Ltd., Tokyo (JP)

(72) Inventor: Eisaku Ishii, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 18/886,467

(22) Filed: Sep. 16, 2024

(65) Prior Publication Data

US 2025/0004685 A1  Jan. 2, 2025

Related U.S. Application Data

(63) Continuation of application No. PCT/JP2022/014555, filed on Mar. 25, 2022.

(51) Int. Cl.
*G06F 3/14* (2006.01)
(52) U.S. Cl.
CPC ........................... *G06F 3/14* (2013.01)
(58) Field of Classification Search
CPC ............................................ G06F 3/14
See application file for complete search history.

(56) References Cited

U.S. PATENT DOCUMENTS

2010/0250553 A1   9/2010  Higuchi et al.

FOREIGN PATENT DOCUMENTS

| CN | 109086366 A | 12/2018 |
| JP | H 11-065434 A | 3/1999 |
| JP | 2006-119408 A | 5/2006 |
| JP | 2010-231270 A | 10/2010 |
| JP | 2011-242699 A | 12/2011 |
| JP | 2019-160112 A | 9/2019 |
| WO | WO 2016/194621 A1 | 12/2016 |

OTHER PUBLICATIONS

WO/2016/194621 machine translation for clarification (Year: 2025).*
International Search Report in PCT/JP2022/014555 dated Jun. 7, 2022 with English translation.

* cited by examiner

*Primary Examiner* — Gustavo Polo
(74) *Attorney, Agent, or Firm* — MCGINN I.P. LAW GROUP, PLLC

(57) ABSTRACT

An information processing device includes a first display control unit configured to display together first content and second content, which is different from the first content, together, in a display area of a display unit. The information processing device further includes an identification unit configured to identify third content and fourth content on the basis of a viewing action for the first content and the second content. The information processing device further includes a second display control unit configured to display, in the display area, the third content as identified and the fourth content as identified. A degree of relevance between the third content and the fourth content is lower than a degree of relevance between the third content and the first content.

11 Claims, 6 Drawing Sheets

FIG. 3

| | CONTENT C1 | CONTENT C2 | CONTENT C3 | CONTENT C4 | CONTENT C5 | CONTENT C6 | CONTENT C7 | CONTENT C8 |
|---|---|---|---|---|---|---|---|---|
| CONTENT C1 | – | $D_{12}$ | $D_{13}$ | $D_{14}$ | $D_{15}$ | $D_{16}$ | $D_{17}$ | $D_{18}$ |
| CONTENT C2 | | – | $D_{23}$ | $D_{24}$ | $D_{25}$ | $D_{26}$ | $D_{27}$ | $D_{28}$ |
| CONTENT C3 | | | – | $D_{34}$ | $D_{35}$ | $D_{36}$ | $D_{37}$ | $D_{38}$ |
| CONTENT C4 | | | | – | $D_{45}$ | $D_{46}$ | $D_{47}$ | $D_{48}$ |
| CONTENT C5 | | | | | – | $D_{56}$ | $D_{57}$ | $D_{58}$ |
| CONTENT C6 | | | | | | – | $D_{67}$ | $D_{68}$ |
| CONTENT C7 | | | | | | | – | $D_{78}$ |
| CONTENT C8 | | | | | | | | – |

FIG. 4

| CONSTITUENT ELEMENT | WEIGHT VALUE |
|---|---|
| PRODUCT (SERVICE) CATEGORY | $W_1$ |
| BRAND | $W_2$ |
| PRICE CLASS (HIGH, MIDDLE, LOW) | $W_3$ |
| CUSTOMER CLASS | $W_4$ |
| ... | ... |
| LAST CONSTITUENT ELEMENT | $W_n$ |

FIG. 5

| VIEWING RATIO OF FIRST CONTENT | VIEWING RATIO OF SECOND CONTENT | DETERMINATION RESULT |
|---|---|---|
| 10% | 14% | (DETERMINATION 1) A AND B ARE NOT INTERESTING |
| 45% | 40% | (DETERMINATION 2) A AND B ARE NOT SUPERIOR |
| 80% | 15% | (DETERMINATION 3) A IS SUPERIOR |
| 12% | 82% | (DETERMINATION 3) B IS SUPERIOR |

INFORMATION PROCESSING DEVICE, DISPLAY SYSTEM, AND INFORMATION PROCESSING METHOD FOR DISPLAYING VIEWER-LATENT-INTEREST-BASED CONTENT

TECHNICAL FIELD

The present invention relates to an information processing device, a display system, and an information processing method.

BACKGROUND ART

In the related art, a content display method of estimating attributes such as sex and age on the basis of a viewer's appearance imaged by a camera, selecting content based on the estimated attributes, and displaying the selected content on a display screen has been used in a digital signage for displaying an advertisement or the like which is visible indoors or outdoors.

A system that displays different pieces of content in a plurality of display areas of a display device and displays content with a highest degree of display desire of a plurality of viewers in a largest subarea out of subareas of the display device on the basis of viewing situations of the plurality of viewers is also known. With this system, most interesting content out of the plurality of displayed pieces of content can be displayed in the largest display subarea.

Citation List

Patent Document

[Patent Document 1]
  Japanese Unexamined Patent Application, First Publication No. 2006-119408

SUMMARY OF INVENTION

Technical Problem

However, when content to be displayed is selected on the basis of classifications of attributes of viewers, content corresponding to attributes estimated from appearances of the viewers can be displayed. However, in this case, the displayed content does not necessarily match internal interests (latent interests) of the viewers. Accordingly, it is difficult to display content based on latent interests of viewers.

In the system disclosed in Patent Document 1, a display size of content with a highest degree of display desire out of a plurality of pieces of content already displayed can be set to be the largest, but content based on latent interests of the viewers cannot be said to be displayed.

Solution to Problem

According to an aspect of the present invention, there is provided an information processing device including: a first display control unit configured to display first content and second content different from the first content in a display area together; an identification unit configured to identify third content and fourth content on the basis of a viewing action for the first content and the second content; and a second display control unit configured to display the identified content in the display area, wherein a degree of relevance between the third content and the fourth content is lower than a degree of relevance between the third content and the first content.

According to another aspect of the present invention, there is provided a display system including: a first display control unit configured to display first content and second content different from the first content in a display area together; an identification unit configured to identify third content and fourth content on the basis of a viewing action for the first content and the second content; a display unit; and a second display control unit configured to display the identified content in the display area of the display unit, wherein a degree of relevance between the third content and the fourth content is lower than a degree of relevance between the third content and the first content.

According to another aspect of the present invention, there is provided an information processing method including: displaying first content and second content different from the first content in a display area together; identifying third content and fourth content on the basis of a viewing action for the first content and the second content; and displaying the identified content in the display area, wherein a degree of relevance between the third content and the fourth content is lower than a degree of relevance between the third content and the first content.

Advantageous Effects of Invention

It is possible to display content based on a latent interest of a viewer.

BRIEF DESCRIPTION OF DRAWINGS

FIG. 3 is a diagram illustrating an example of inter-content distance data indicating a distance between content.
FIG. 4 is a diagram illustrating an example of weight data.
FIG. 5 is a diagram illustrating an example, in which determination is performed on viewing actions.

DESCRIPTION OF EMBODIMENTS

An aspect of the present invention will be described below in detail with reference to the accompanying drawings.

Figure 1:
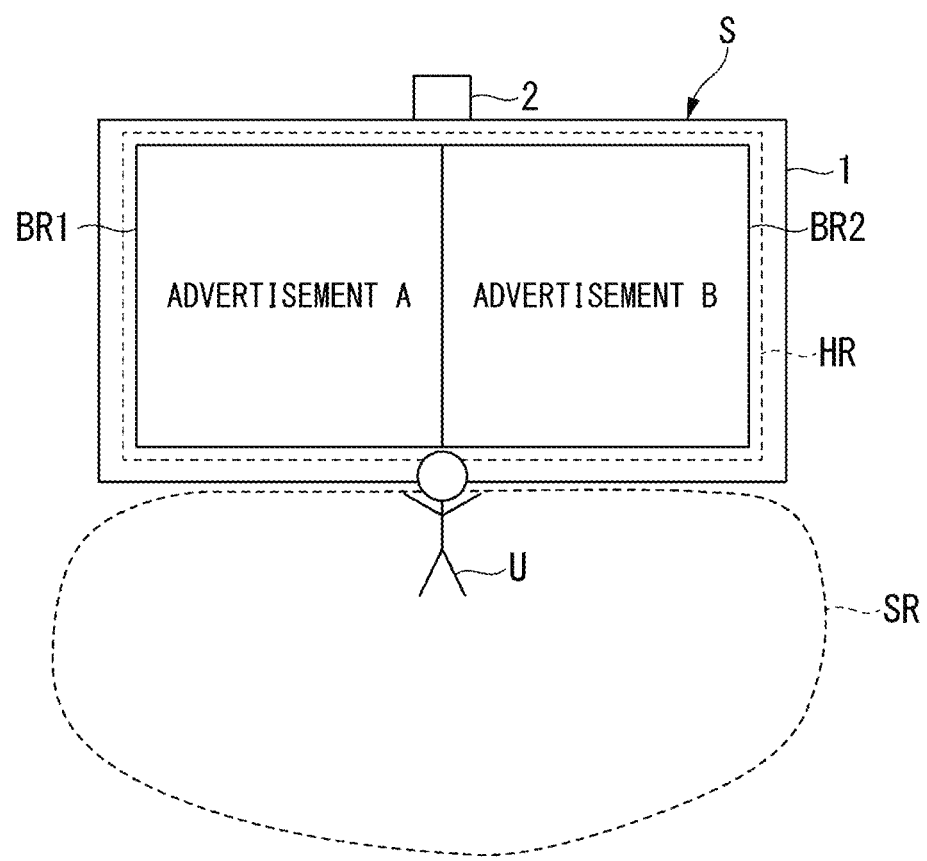
FIG. 1 is an overhead view illustrating a display system according to an embodiment as a whole.

FIG. 1 is an overhead view illustrating a display system according to an embodiment as a whole.

The display system S includes a display device 1 and a camera 2. The display device 1 and the camera 2 are electrically connected to each other via a communication cable.

The display device 1 displays an image signal in a display area. The display area HR on a display screen of the display device 1 is divided into a plurality of display subareas. Here, one display area HR is divided into two display subareas (a subarea BR1 and a subarea BR2). The subarea BR1 and the subarea BR2 are arranged in a horizontal direction. The subareas may be arranged in a vertical direction.

In the subarea BR1 and the subarea BR2, different pieces of content are displayed in a display period in which content is displayed.

The display device 1 is installed in a place which persons can enter such as a station yard, a station square, a public facility, an event hall, or a shopping mall.

The camera 2 is attached to an upper part of the display device 1.

The camera 2 images an area including a position at which a display screen of the display device 1 can be viewed. For example, an imaging area SR of the camera 2 is an area in front of a display area HR in which the display area HR can be viewed from near the display device 1. The imaging area SR may be an area including a position through which users can pass and can also stop. A user U can view the display area HR from at least a position in the imaging area SR. In the drawing, an example in which a user U who is a viewer is present in the imaging area SR at a certain moment is illustrated.

The camera 2 has a function of continuously capturing an image at an arbitrary frame rate and a function of outputting imaging data which is an imaging result of the imaging area SR.

Figure 2:
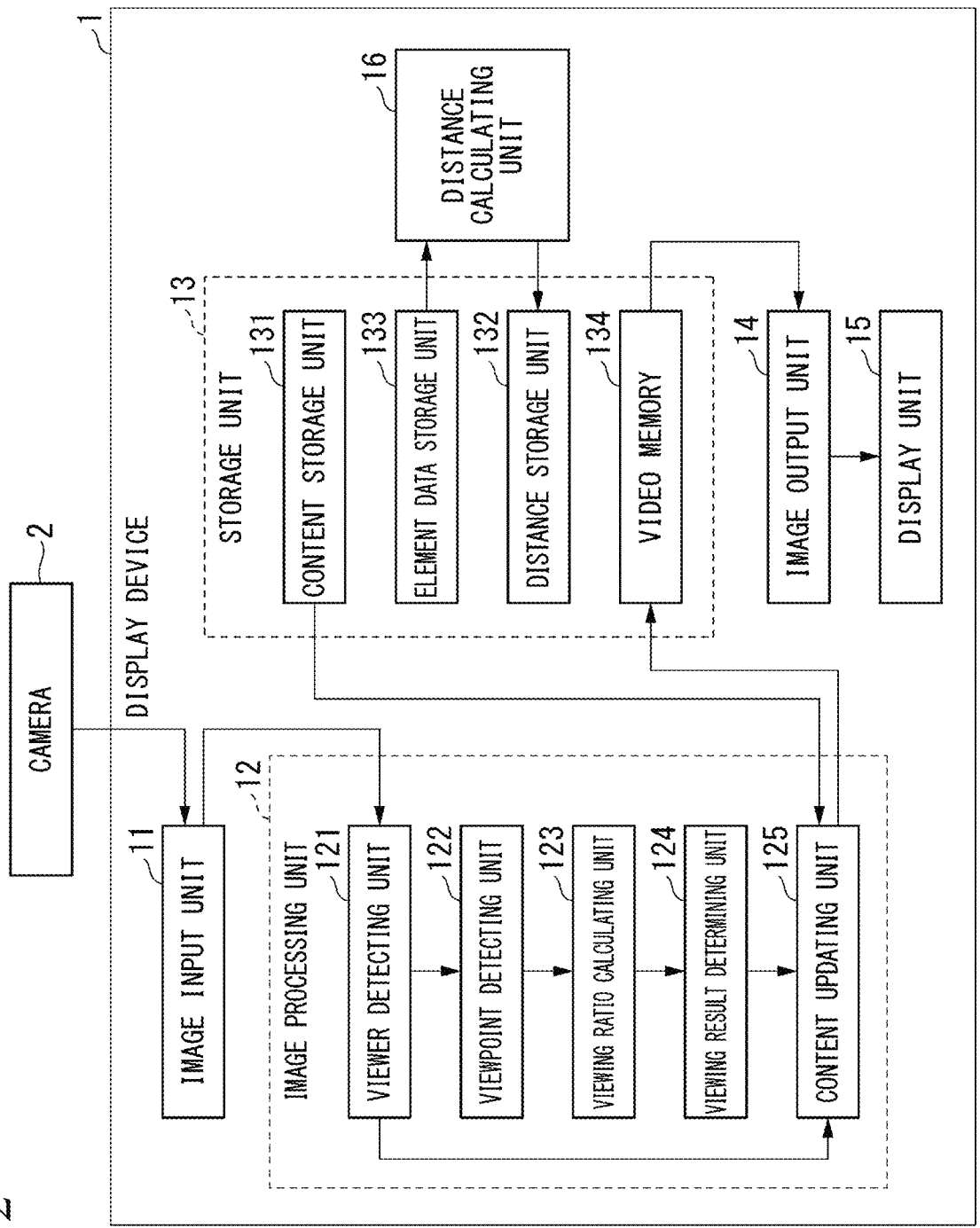
FIG. 2 is a functional block diagram illustrating a configuration of a display system S.

FIG. 2 is a functional block diagram illustrating a configuration of the display system S.

The display device 1 includes an image input unit 11, an image processing unit 12, a storage unit 13, an image output unit 14, a display unit 15, and a distance calculating unit 16.

The image input unit 11 acquires imaging data output from the camera 2. The image input unit 11 supplies the acquired imaging data to the image processing unit 12.

The image processing unit 12 includes a viewer detecting unit 121, a viewpoint detecting unit 122, a viewing ratio calculating unit 123, a viewing result determining unit 124, and a content updating unit 125.

The image processing unit 12 acquires imaging data supplied from the image input unit 11.

The viewer detecting unit 121 performs an image recognizing process on the imaging data supplied from the image input unit 11 and detects a person included in the imaging data. The viewer detecting unit 121 estimates attributes of the person on the basis of external features of the detected person.

The viewpoint detecting unit 122 detects a position of a viewpoint indicating where the detected person sees. For example, when the person sees the display area HR of the display device 1, the viewpoint detecting unit 122 detects in which of the subarea BR1 and the subarea BR2 the detected position of the viewpoint is. Accordingly, the viewpoint detecting unit 122 detects which of content displayed in the subarea BR1 and content displayed in the subarea BR2 the person sees.

The viewing ratio calculating unit 123 measures a first time over which a sightline is directed to content displayed in the subarea BR1 and a second time over which the sightline is directed to content displayed in the subarea BR2 in a display period in which content is displayed on the basis of the sightline of the viewer detected by the viewpoint detecting unit 122. The viewing result determining unit 124 calculates a viewing ratio on the basis of the measured first time and the measured second time.

The display period in which content is displayed is a display time indicating a time from start to end of reproduction of one piece of content. Here, reproduction of the pieces of content displayed in the subarea BR1 and the subarea BR2 is started at the same timing in the same display time.

The first time is a total time over which the sightline is directed to the subarea BR1 in the display time, and the second time is a total time over which the sightline is directed to the subarea BR2 in the display time.

The viewing ratio calculating unit 123 calculates the viewing ratio by dividing a viewing time over which one piece of content is viewed by the display time. The viewing ratio calculating unit 123 calculates the viewing ratio for each of two pieces of content. That is, the viewing ratio calculating unit 123 calculates the viewing ratio for content displayed in the subarea BR1 by dividing the first time by the display time and calculates the viewing ratio for content displayed in the subarea BR2 by dividing the second time by the display time.

Here, a period in which a sightline of a viewer U is not directed to the display area HR may be included in the display period in which content is displayed. Accordingly, the viewing ratio has a value equal to or less than 100%.

Here, a viewing action is movement of a viewpoint of a viewer and includes an action of gazing at content, an action of repeating instantaneously directing a sightline to content (a glancing action), and an action of glimpsing content. Gazing is an action of continuously directing a sight line to one piece of content. Glimpsing is an action of temporarily directing a sightline to one piece of content in a moment.

The glancing action may mean, for example, a case in which a viewer is interested in the displayed content but cannot continuously direct the sightline to the content (for example, a case in which the viewer feels uneasy about other's eyes and a case in which the viewer has to look in front as well as see the display device 1 because the viewer is walking). In this case, by considering the number of glancing times and a time period thereof, it is possible to estimate in which content the viewer is interested even when the viewer does not continuously view one piece of content.

Since a total time over which the sightline is directed to the content is calculated as the first time and the second time, it is possible to calculate a viewing ratio in consideration of action details irrespective of whether the viewer performs a gazing action, a glancing action, or a glimpsing action.

Here, the viewing ratio calculating unit 123 may calculate the viewing ratio on the basis of a method other than the aforementioned method. When the viewing ratio is calculated using another method, the viewing result determining unit 124 may calculate the viewing ratio on the basis of the number of times the sightline is directed to content in the content display period and a total time over which the sightline is directed to the content to be measured. In this case, the viewing ratio calculating unit 123 may calculate the viewing ratio by dividing the total time over which the sightline is directed to the content to be measured by the display time and multiplying the resultant value by a weight based on the number of times the sightline is directed to the content. In this case, the viewing ratio of one piece of content may be greater than 100%.

The viewing result determining unit 124 determines a viewing action of the viewer U on the basis of the viewing ratios of the content displayed in the subarea BR1 and the content displayed in the subarea BR2.

The viewing result determining unit 124 has a function of a first determination unit configured to determine which of first content and second content is superior on the basis of the viewing action.

The viewing result determining unit 124 determines content with a longer cumulative time as superior content on the basis of a first cumulative time in which the first content has been viewed in the content display period and a second cumulative time in which the second content has been viewed.

The viewing result determining unit 124 determines which content is superior on the basis of the number of times the sightline is directed to the first content in the content display period and the number of times the sightline is directed to the second content.

The viewing result determining unit 124 has a function of a second determination unit configured to determine whether the viewer is interested in the first content and the second content on the basis of the viewing action.

The viewing result determining unit 124 determines whether the viewer is interested in the content by comparing the viewing ratio with a reference value RL. Here, the viewing result determining unit 124 determines whether the viewer is interested in the content displayed in the subarea BR1 by comparing the viewing ratio for the content displayed in the subarea BR1 with the reference value RL. The viewing result determining unit 124 determines whether the viewer is interested in the content displayed in the subarea BR2 by comparing the viewing ratio for the content displayed in the subarea BR2 with the reference value RL.

For example, the viewing result determining unit 124 determines that the viewer is not interested in the content displayed in the subarea BR1 when the viewing ratio for the content displayed in the subarea BR1 is less than the reference value RL and determines that the viewer is interested in the content displayed in the subarea BR1 when the viewing ratio is equal to or greater than the reference value RL.

The viewing result determining unit 124 determines whether the content is superior by comparing the viewing ratio with a reference value RH. Here, the viewing result determining unit 124 determines whether the content displayed in the subarea BR1 is superior by comparing the viewing ratio for the content displayed in the subarea BR1 with the reference value RH. The viewing result determining unit 124 determines whether the content displayed in the subarea BR2 is superior by comparing the viewing ratio for the content displayed in the subarea BR2 with the reference value RH.

Here, superiority means which of the content displayed in the subarea BR1 and the content displayed in the subarea BR2 the viewer is viewing with a higher interest. Superior content means that a viewer is interested in the content and views the content with a higher interest.

The reference value RH is larger than the reference value RL. The determination result from the viewing result determining unit 124 includes a result indicating that one of the content displayed in the subarea BR1 and the content displayed in the subarea BR2 is superior and a result indicating that none thereof is superior.

The reference value RH is larger than the reference value RL. At most one piece of superior content out of two pieces of content can be determined by using a value of the viewing ratio which is greater than 0.5 (50%) and equal to or less than 100% as the reference value RH.

FIG. 5 is a diagram illustrating an example in which determination is performed on viewing actions.

In the drawing, a relationship in determination result between a viewing ratio of first content and a viewing ratio of second content is illustrated. For example, when the reference value RL is 20%, the reference value RH is 70%, the viewing ratio of the first content is "10%," and the viewing ratio of the second content is "14%," the determination results represent that the first content and the second content are "not interesting." In this case, none of the first content and the second content can be determined to be superior, but the determination results indicating that the first content and the second content are "not interesting" are used.

When the viewing ratio of the first content is "45%" and the viewing ratio of the second content is "40%," the determination results represent that the first content and the second content are "not superior." In this case, both the first content and the second content can be determined to be interesting, but the determination results indicating that the first content and the second content are "not superior" are used.

When the viewing ratio of the first content is "80%" and the viewing ratio of the second content is "15%," the determination results represent that the first content is "superior." In this case, it can be determined that the first content is interesting and the second content is not interesting and not superior, but the determination result indicating that the first content is "superior" is used.

When the viewing ratio of the first content is "12%" and the viewing ratio of the second content is "82%," the determination results represent that the second content is "superior." In this case, it can be determined that the second content is interesting and the first content is not interesting and not superior, but the determination result indicating that the second content is "superior" is used.

When superiority is determined, the viewing result determining unit 124 may calculate the viewing ratio on the basis of a viewing time or may calculate the viewing ratio on the basis of the viewing time and the number of times a sightline is directed to the content and determine superiority on the basis of the calculated viewing result.

The reference value RL and the reference value RH may be stored in the storage unit 13. In this case, the viewing result determining unit 124 can perform determination of whether it is interesting and determination of whether it is superior by reading the reference value RL and the reference value RH from the storage unit 13.

In this way, the viewing result determining unit 124 may determine the viewing action on the basis of the viewing ratio based on the viewing time or may determine the viewing action on the basis of the viewing ratio based on the number of viewing times.

The content updating unit 125 identifies content to be displayed in the subarea BR1 and content to the displayed in the subarea BR2 on the basis of the determination result from the viewing result determining unit 124.

The content updating unit 125 has a function of an identification unit configured to identify third content and fourth content with a low degree of relevance with the third content on the basis of the viewing actions on the first content and the second content.

Since the third content and the fourth content with a low degree of relevance with the third content are identified on the basis of the viewing actions on the first content and the second content, the third content and the fourth content with a low degree of relevance with the third content are displayed in the display area.

Here, the "third content and the fourth content with a low degree of relevance with the third content" which are identified by the content updating unit 125 specifically include following examples (1) and (2).

(1) The third content and the fourth content are identified such that the degree of relevance between the third content and the fourth content is lower than the degree of relevance between the third content and the first content.

For example, content based on an attribute which is estimated on the basis of external features of a viewer is selected as the first content, and content with a low degree of relevance with the first content is selected as the second content. When the third content is selected, content with a high degree of relevance with the first content is selected and thus the third content can be expected to be interesting a viewer. On the other hand, since the degree of relevance between the third content and the fourth content is lower than the degree of relevance between the first content and the third content, content with a low degree of relevance with the first content is selected as the fourth content. Accordingly, the fourth content does not necessarily correspond to the estimated attribute of the viewer, but is likely to be content in which the viewer is latently interested. This content is used as the fourth content and is displayed along with the third content. Accordingly, it is possible to display content which the viewer is likely to be interested as the third content and to display content which the viewer is expected to be latently likely to be interested. It is also possible to ascertain whether the viewer is interested in the fourth content on the basis of the viewing action of the viewer.

When "the degree of relevance between the third content and the fourth content is lower than the degree of relevance between the third content and the first content," the third content may have a relationship that the degree of relevance with the first content is high or a relationship that the degree of relevance with the first content is low. That is, even when the degree of relevance of the third content with the first content is low, the degree of relevance of the fourth content with the third content has only to be lower than the degree of relevance of the third content with the first content. This means that, when the third content and the fourth content are identified in Determination Pattern P1, a content combination including content closest to the first content or a content combination including content closest to the second content are excluded from a display target, but the degree of relevance between the third content and the fourth content has only to be lower than the degree of relevance between the third content and the first content. Accordingly, "the degree of relevance between the third content and the fourth content is lower than the degree of relevance between the third content and the first content" does not mean that it is excluded from a process of identifying content in Determination Pattern P1.

(2) A second content candidate having a relationship that the degree of relevance between one of the second content and the third content and the second content candidate different from a first content candidate out of a plurality of content candidates is lower than the degree of relevance between the one content (the second content or the third content) and the first content candidate out of the plurality of content candidates is identified as the fourth content.

Accordingly, content with a low degree of relevance with the second content or the third content is identified as the fourth content.

In this case, even after the second content with a low degree of relevance with the first content has been displayed, content which is expected to be latently interesting from a point of view different from the second content can be identified from the content candidates and displayed as the fourth content. Accordingly, it is possible to find content which is likely to correspond to a latent interest of a viewer and to sequentially display the found content.

In this case, when the third content is displayed, content with a low degree of relevance with the third content can be identified from the content candidates and displayed as the fourth content.

For example, the "third content and the fourth content with a low degree of relevance with the third content" may be content with no relationship or content without a high relationship.

The content updating unit 125 identifies the fourth content such that the degree of relevance between the second content and the fourth content is lower than the degree of relevance between the third content and the first content. Accordingly, even when a viewer is not latently interested in the second content, content in which the viewer is likely to be interested can be displayed as the third content and content in which the viewer is expected to be latently interested can be displayed as the fourth content from a point of view different from the second content. Accordingly, it is possible to display content in which the viewer is expected to be latently interested while finding the viewer's latent interest.

Even when a viewer is not much interested in the second content, it is possible to allow the viewer to view the fourth content of which the degree of relevance with the second content is low and to display content in which the viewer can be expected to be interested.

The content updating unit 125 identifies a fourth content candidate out of a plurality of content candidates in which a degree of relevance between the fourth content candidate different from a third content candidate out of the plurality of content candidates and the first content is higher than a degree of relevance between the third content candidate and the first content as the third content. Accordingly, when the first content is interesting or superior, it is possible to identify content with a higher degree of relevance with the first content as the third content and to display the third content. As a result, it is possible to display content which can be expected to be interesting to a viewer using the first content as a clue.

The content updating unit 125 identifies content with a high degree of relevance with the content determined to be superior as the third content. Since the third content to be next displayed can be identified using superior content as a start point, it is possible to enhance a likelihood that a viewer can be interested in the third content.

When it is determined that one of the first content and the second content is superior, the content updating unit 125 excludes the displayed first content and the displayed second content from content candidates, identifies content with a high degree of relevance with the content determined to be superior as the third content, and identifies content with a low degree of relevance with the third content as the fourth content. When one of the first content and the second content is superior, the displayed first content and the displayed second content are excluded from the content candidates. Accordingly, since the first content gives a viewer an interest and is excluded from a display target, it is possible to prevent the same content from being repeatedly displayed. Since the first content is superior and the second content is considered not to be latently interesting, the second content is not displayed next. Since the third content can be determined using the first content as a start point, a viewer can be expected to be interested in the third content. Moreover, by identifying content with a low degree of relevance with the third content as the fourth content and displaying the fourth content, it is possible to find a viewer's latent interest using the third content as a start point.

The content updating unit 125 identifies the third content and the fourth content from remaining content candidates obtained by excluding content determined not to be interesting from a plurality of content candidates.

For example, when the viewing result determining unit 124 has determined that the viewing ratios of two pieces of content are less than the reference value RL, the content updating unit 125 identifies content to be displayed next from the remaining content except the two pieces of content. Accordingly, by not displaying content estimated not to be interesting, content can be identified from the content candidates expected to be interesting, and the identified content can be displayed.

The storage unit 13 includes a content storage unit 131, a distance storage unit 132, an element data storage unit 133, and a video memory 134.

The content storage unit 131 stores various types of content. The content may be a still image or a moving image. The content may be, for example, one of an advertisement, a notice, guidance, and news.

The storage unit 13 is constituted by a storage medium, for example, a hard disk drive (HDD), a flash memory, an electrically erasable programmable read only memory (EEPROM), a random access read/write memory (RAM), a read only memory (ROM), or an arbitrary combination of the storage mediums.

The storage unit 13 may be constituted, for example, by a nonvolatile memory.

The distance storage unit 132 stores a degree of relevance between different pieces of content (a degree of relevance). Here, the degree of relevance expresses a degree of difference between different pieces of content as a distance.

FIG. 3 is a diagram illustrating an example of inter-content distance data indicating a distance between pieces of content stored in the distance storage unit 132.

In the vertical direction and the horizontal direction, identification numbers for content are allocated. A value indicating an inter-content distance is stored in a field in which a row indicated by a content identification number in the row direction (the horizontal direction) and a column indicated by a content identification number in the column direction (the vertical direction) cross.

For example, a distance between content C3 and content C5 is D35. A distance between content C6 and content C8 is D68. The degree of relevance becomes lower as the distance becomes larger (the value of the distance increases), and the degree of relevance becomes higher as the distance becomes smaller (the value of the distance decreases).

The element data storage unit 133 stores element data for calculating the inter-content distance. The element data includes, for example, weight data and distance data.

FIG. 4 is a diagram illustrating an example of weight data. The weight data is data in which an element and a weight value are correlated.

The element indicates a type of a content element. The element can also indicate a point of view for evaluating the content. The weight value indicates a value of a weight. Here, a weight value "$W_2$" is correlated with an element "brand," and a weight value "$W_4$" is correlated with an element "customer class."

The distance data indicates a difference in element between content. For example, differences in element between content M and content N in the distance data are $d_1$, $d_2$, $d_3$, ..., $d_n$. For example, $d_1$ indicates a difference in an element "product (service) category" between content M and content N, and $d_2$ indicates a difference in an element "brand" between content M and content N.

The distance calculating unit 16 calculates distance data on the basis of the data stored in the element data storage unit 133 and stores the calculation result in the distance storage unit 132.

When the differences in element between content M and content N are $d_1$, $d_2$, $d_3$, ..., $d_n$, the distance calculating unit 16 calculates an inter-content distance $D_{MN}$ using Expression (1). The inter-content distance is a sum of values obtained by multiplying differences in a plurality of elements between two pieces of content by the weight values based on the elements.

$$D_{MN} = W_1 d_1 + W_2 d_2 + W_3 d_3 + \ldots W_n d_n \quad (1)$$

The video memory 134 temporarily stores content to be displayed.

The image output unit 14 reads content to be displayed from the video memory 134, generates a drive signal for driving the display unit 15 on the basis of the read content, and outputs the generated drive signal to the display unit 15.

The image output unit 14 has a function of a first display control unit configured to display first content and second content different from the first content in a display area HR together.

The image output unit 14 has a function of a second display control unit configured to display identified content in the display area.

The image output unit 14 has a function of displaying a sixth content candidate out of a plurality of content candidates in which a degree of relevance between the sixth content candidate different from a fifth content candidate out of the plurality of content candidates and the first content is lower than the degree of relevance between the fifth content candidate and the first content as the second content in the display area. The image output unit 14 selects the first content and the second content in advance and displays the selected content in the display area.

The image output unit 14 may generate a drive signal for driving each pixel of the display unit 15 according to content stored in the video memory 134 and output the generated drive signal to the display unit 15.

The display unit 15 displays content. The display unit 15 is, for example, a liquid crystal panel. The display unit 15 displays an image based on content by driving elements of each pixel according to the drive signal output from the image output unit 14.

Operations of the display device 1 according to the embodiment will be described below.

Figure 6:
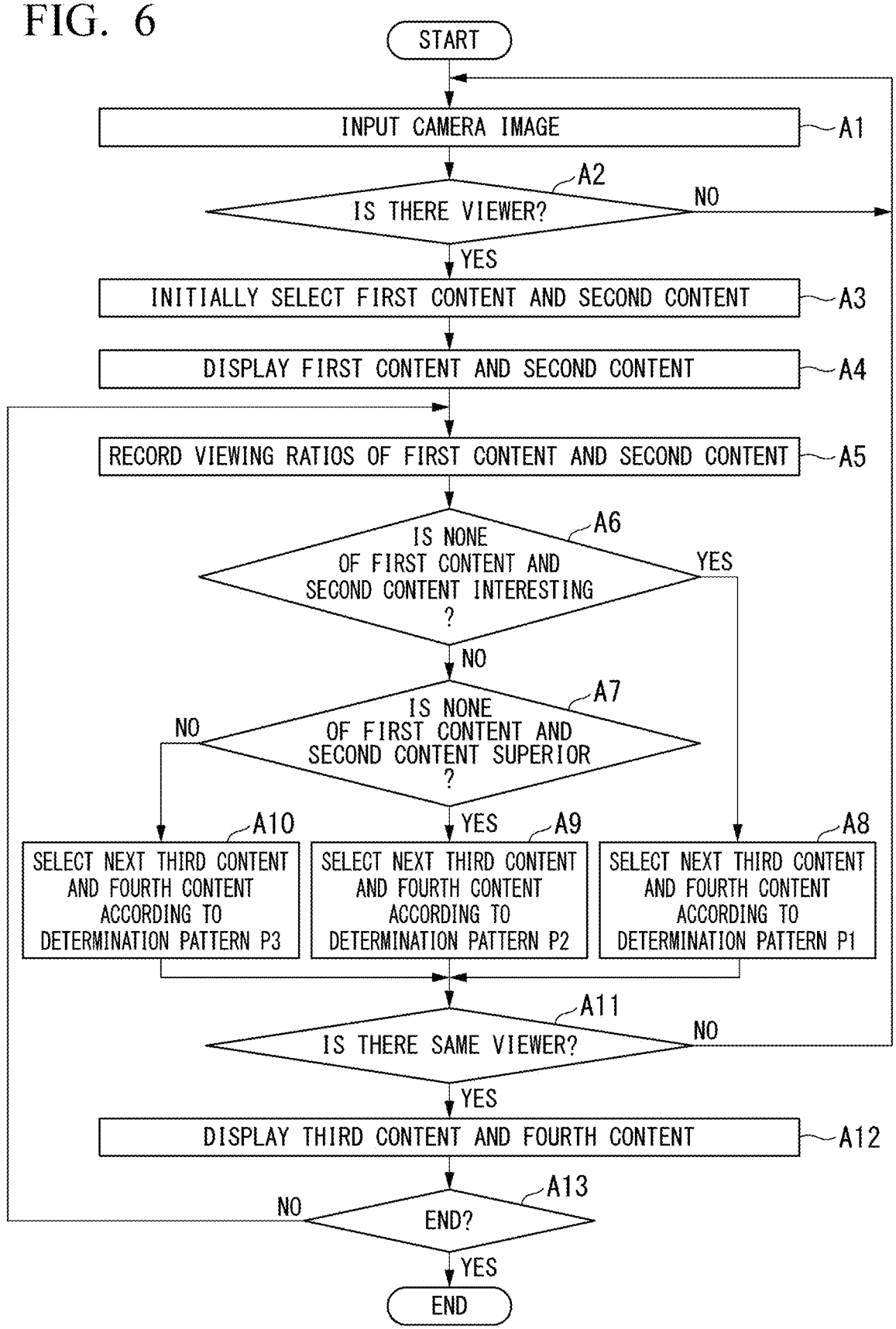
FIG. 6 is a flowchart illustrating operations of a display device 1.

FIG. 6 is a flowchart illustrating the operations of the display device 1.

The camera 2 images the imaging area SR and outputs imaging data.

The image input unit 11 of the display device 1 receives an input of imaging data acquired from the camera 2 (Step A1). The viewer detecting unit 121 of the image processing unit 12 acquires the imaging data received by the image input unit 11 and detects whether there is a viewer in the imaging data (Step A2). When no viewer is detected (Step A2: NO), the operation flow proceeds to Step A1 with performing nothing. In this case, when no viewer is detected from the imaging data, the image processing unit 12 may identify default content from the content storage unit 131 using the content updating unit 125 and write the identified content to the video memory 134. The image output unit 14 can display the content written to the video memory 134 on the display unit 15. Accordingly, the default content is displayed in the display area HR of the display device 1. As the default content, one piece of default content may be displayed in the display area HR of the display device 1. Alternatively, out of different pieces of default content, one piece of default content may be displayed in the subarea BR1 and another piece of default content may be displayed in the subarea BR2.

On the other hand, when a viewer is detected by the viewer detecting unit 121, the image processing unit 12 instructs the content updating unit 125 to identify initial content. The content updating unit 125 identifies the initial content from the content storage unit 131 in response to this instruction. Here, the content updating unit 125 identifies first content and second content as the initial content (Step A3).

Here, when the first content and the second content are identified as the initial content, the content updating unit 125 identifies a plurality of combinations of content of which the inter-content distance has a large value and randomly identifies one combination thereof.

In another method, when the first content and the second content are identified as the initial content, the content updating unit 125 may identify an advertisement to be preferentially displayed according to attributes estimated by the viewer detecting unit 121 on the basis of an appearance of the detected viewer as the first content similarly to a generally used target advertisement and identify content with a largest inter-content distance from the first content (with a largest value of the distance) as the second content. That is, in this case, content based on attributes of a person included in the imaging data is selected as the first content, and content with a low degree of relevance with the first content is selected as the second content.

When the first content and the second content are identified, the content updating unit 125 reads the identified first content and the identified second content from the content storage unit 131 and writes the read content to the video memory 134.

The image output unit 14 reads the content written to the video memory 134 and displays the read content on the display unit 15 (Step A4). For example, the image output unit 14 displays the first content in the subarea BR1 and displays the second content in the subarea BR2. Accordingly, both the first content and the second content are displayed in the content display period.

When the content is displayed, the viewpoint detecting unit 122 detects a sightline of a viewer U for the first content and the second content.

When the sightline of the viewer to the first content and the second content is detected by the viewpoint detecting unit 122, the viewing ratio calculating unit 123 measures and records viewing ratios of two pieces of content on the basis of the detection result (Step A5).

The viewing result determining unit 124 determines a viewing action on the basis of the viewing ratio for the first content and the viewing ratio for the second content (Step A6). Here, the viewing result determining unit 124 determines whether any of the viewing ratio for the first content and the viewing ratio for the second content is less than a threshold value RL.

When any of viewing ratios for the first content and the second content is less than the threshold value RL (Step A6: YES), the viewing result determining unit 124 determines that the viewing action is Determination Pattern P1 indicating that "the first content and the second content are not interesting."

When the viewing result determining unit 124 determines that the viewing action is Determination Pattern P1, the content updating unit 125 identifies third content and fourth content based on Determination Pattern P1 (Step A8).

Here, since the determination pattern is 1, the content updating unit 125 excludes the first content and the second content from a display target and identifies two pieces of content to be displayed next from the remaining content. For example, the content updating unit 125 identifies two pieces of content as the third content and the fourth content. Since a plurality of combinations of content with a large inter-content distance are identified in Step A3, the content updating unit 125 identifies one combination of next superior content from the remaining combinations of content except the first content and the second content out of the plurality of combinations of content and uses the one combination as the third content and the fourth content. As the combination of next superior content, a combination of content with a largest distance is identified out of the remaining combinations of content.

Here, out of the remaining combinations of content, a combination of content including content closest to the first content or a combination of content including content closest to the second content may be excluded from the display target.

Thereafter, the image processing unit 12 causes the operation flow to proceed to Step A11.

On the other hand, when it is determined in Step A6 that at least one of the viewing ratios for the first content and the second content is equal to or greater than the threshold value RL (Step A6: NO), the viewing result determining unit 124 determines whether the any of the viewing ratio for the first content and the viewing ratio for the second content is less than a threshold value RH (Step A7).

When any of the viewing ratios for the first content and the second content is less than the threshold value RH (Step A7: YES), the viewing result determining unit 124 determines that the viewing action is Determination Pattern P2 indicating that "none of the first content and the second content is superior."

When the viewing result determining unit 124 determines that the viewing action is Determination Pattern P2, the content updating unit 125 identifies the third content and the fourth content based on Determination Pattern P2 (Step A9).

Here, since the determination pattern is 2, the content updating unit 125 identifies the content with a higher viewing ratio out of the viewing ratios for the first content and the second content and identifies content with the smallest distance from the content with the higher viewing ratio as the third content from the remaining content. The content updating unit 125 identifies content with the largest distance from the third content as the fourth content.

Thereafter, the image processing unit 12 causes the operation flow to proceed to Step A11.

On the other hand, when the viewing result determining unit 124 determines that any of the viewing ratios for the first content and the second content is greater than the threshold value RH in Step A7 (Step A7: NO), the viewing result determining unit 124 determines that the viewing action is Determination Pattern P3 indicating that "one of the first content and the second content is superior."

When the viewing result determining unit 124 determines that the viewing action is Determination Pattern P3, the content updating unit 125 identifies the third content and the fourth content based on Determination Pattern P3 (Step A10).

Here, since the determination pattern 3, the content updating unit 125 ends displaying of the content determined to be superior on the basis of the viewing ratios for the first content and the second content, excludes the content from a display target for the corresponding viewer, determines that the other content is not interesting, and excludes the other content from the display target. Then, the content updating unit 125 identifies content with the smallest distance from the content determined to be superior as the third content and identifies content with the largest distance from the identified third content as the fourth content (Step A10).

Thereafter, the image processing unit 12 causes the operation flow to proceed to Step A11.

Then, in Step A11, the viewer detecting unit 121 determines whether the same viewer is detected (Step A11).

When the viewer detecting unit 121 detects that the same viewer is detected (Step A11: YES), the content updating unit 125 writes the content identified in any of Steps A8 to A10 to the video memory 134 with the third content as new first content and with the identified content as the fourth content.

The image output unit 14 reads the content written to the video memory 134 and displays the read content on the display unit 15 (Step A12). For example, the image output unit 14 displays the new first content in the subarea BR1 and displays new second content in the subarea BR2. Accordingly, both the first content and the second content are displayed in the content display period.

On the other hand, when it is determined in Step A11 that the same viewer is not detected because the viewer departs from a space in front of the display device 1 or the like (Step A11: NO), the image processing unit 12 causes the operation flow to proceed to Step A1.

The image processing unit 12 determines whether to end the operation flow after Step A12 and ends the operation flow when it is determined that the operation flow is to be ended (Step A13: YES). When it is determined that the operation flow is not to be ended (Step A13: NO), the operation flow proceeds to Step A5.

Thereafter, when the same viewer is detected, it is possible to continuously display content in which the viewer is latently interested by repeating Steps A5 to A12.

According to the aforementioned embodiment, content candidates to be displayed are not narrowed in the initial stage (for example, in a stage in which a person is detected in the imaging area SR), content to be displayed next is identified on the basis of a viewing action for two pieces of content which are displayed, and the identified content can be displayed as target content.

In the aforementioned embodiment, two pieces of content can be simultaneously displayed as target content in a digital signage, and two advertisements to be displayed next can switch on the basis of a determination result in interest acquired from a viewer's viewing action.

In the aforementioned embodiment, a difference between content is defined as an inter-content distance, and content can be efficiently displayed for a short time while finding a viewer's latent interest in various types of content.

In the aforementioned embodiment, in a digital signage for displaying content of an advertisement or the like, two advertisements are simultaneously displayed for one viewer, and the viewer's viewing action for the two pieces of content is identified. Content which the viewer is interested in or which is superior is identified as one piece of content, content with a large value from the one piece of content is identified as the other content, and these two pieces of content are displayed. Accordingly, it is possible to estimate a latent interest of the viewer and to display content in which the viewer is expected to be latently interested.

According to the aforementioned embodiment, since content with a large distance from content identified on the basis of estimated attributes of a viewer is identified and these two pieces of content are displayed, it is possible to identify content by finding a latent interest which is hard to identify from an external appearance such as an appearance.

In the related art, there is a target content displaying method of estimating personal attributes such as age, sex, and costume acquired from external features such as an appearance of a viewer and displaying content based on the attributes. In this display method, since attributes estimated from a target viewer are always the same, content to be displayed is always the same and thus it is difficult to display various advertisements. On the other hand, according to the aforementioned embodiment, since content with a large inter-content distance is also displayed as well as content based on attributes determined on the basis of an appearance, it is possible to prevent the same content from being always displayed.

In the aforementioned embodiment, the inter-content distance is calculated on the basis of Expression (1), but the distance may be determined without using the expression. For example, a manager who designs an inter-content distance may determine the inter-content distance on the basis of experiences, knowledge, or the like and store the value by writing the value to the distance storage unit 132. The inter-content distance may be collected by acquiring questionnaire results about a degree of relevance between content from a plurality of persons, and the inter-content distance may be written to the distance storage unit 132 on the basis of the collection results.

Figure 7:
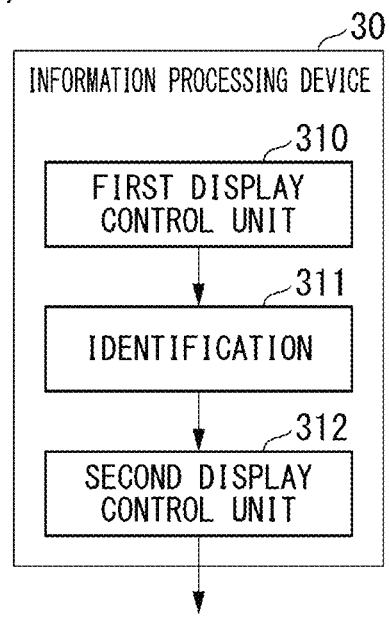
FIG. 7 is a functional block diagram schematically illustrating a configuration of an information processing device 30 which is used for a display system according to another embodiment.

FIG. 7 is a functional block diagram schematically illustrating a configuration of an information processing device 30 which is used for a display system according to another embodiment.

The information processing device 30 includes a first display control unit 310, an identification unit 311, and a second display control unit 312. The first display control unit 310 displays first content and second content different from the first content in a display area together. The identification unit 311 identifies third content and fourth content with a lower degree of relevance with the third content on the basis of viewing actions for the first content and the second content. The degree of relevance between the third content and the fourth content which are identified herein is lower than the degree of relevance between the third content and the first content. The second display control unit 312 displays the identified content in the display area.

The information processing device 30 is connected to a display device. The second display control unit 312 displays the identified content in the display area of the display device connected thereto.

Figure 8:
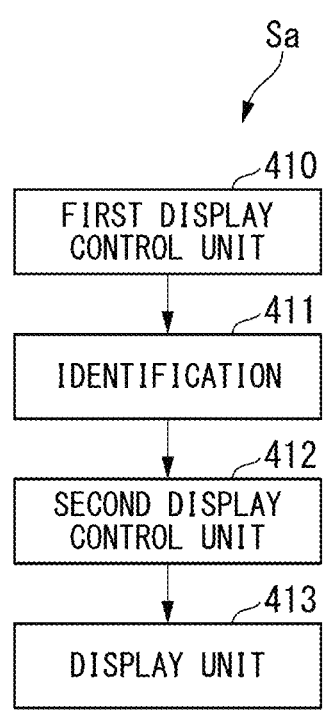
FIG. 8 is a functional block diagram schematically illustrating a configuration of a display system Sa according to another embodiment.

FIG. 8 is a functional block diagram schematically illustrating a configuration of a display system Sa according to another embodiment.

A first display control unit 410 displays first content and second content different from the first content in a display area together. An identification unit 411 identifies third content and fourth content with a lower degree of relevance with the third content on the basis of viewing actions for the first content and the second content. The degree of relevance between the third content and the fourth content which are identified herein is lower than the degree of relevance between the third content and the first content. A second display control unit 412 displays the identified content in the display area of a display unit 413. The display unit 413 displays content. The display unit 413 may be a liquid crystal display panel.

The display system Sa may include, for example, an information processing device and a display device. In this case, the information processing device is, for example, a computer and includes the first display control unit 410, the identification unit 411, and the second display control unit 412. The display device includes the display unit 413. The information processing device is connected to the display device via an image cable and supplies an image signal indicating content to the display device. Accordingly, the content is displayed by displaying the image signal in the display area of the display device.

The image input unit 11, the image processing unit 12, the image output unit 14, and the distance calculating unit 16 in the information processing device 10 illustrated in FIG. 2, the first display control unit 310, the identification unit 311, and the second display control unit 312 in the information processing device 30 illustrated in FIG. 7, and the first display control unit 410, the identification unit 411, and the second display control unit 412 in the display system Sa illustrated in FIG. 8 may be constituted, for example, by a processor such as a central processing unit (CPU) or a dedicated electronic circuit.

The image input unit 11, the image processing unit 12, the image output unit 14, and the distance calculating unit 16 may be mounted, for example, in a computer installed in the display device 1, or various functions may be realized by causing a central processing unit (CPU) to read and execute a program stored in a storage device.

The information processing device 30 is, for example, a computer and may realize various functions by causing a central processing unit (CPU) to read and execute a program stored in a storage device.

The display system S and the display system Sa may be, for example, a digital signage.

In the aforementioned embodiment, the subarea BR1 and the subarea BR2 in the display device 1 may have the same area or different areas. The subarea BR1 and the subarea BR2 may have the same shape or different shapes.

In the aforementioned embodiments, the display device may be a liquid crystal display device or a projector. When the display device is a projector, the display device displays an image signal by projecting the image signal to a display area of a screen.

The number of display devices may be one or two or more. When two or more display devices are used, a multi-display system in which the two or more display devices are installed to be adjacent to each other can be constructed. When the display device is a projector, a multi-display system can be constructed by projecting image signals from two or more projectors to be adjacent to each other.

Construction management may be performed by recording a program for realizing the functions of the processing units illustrated in FIG. 1 on a computer-readable recording medium and causing a computer system to read and execute the program recorded on the recording medium. The "computer system" mentioned herein includes an OS or hardware such as peripherals.

The "computer system" includes a homepage provision environment (or display environment) when a WWW system is used.

The "computer-readable recording medium" means a portable medium such as a flexible disk, a magneto-optical disc, a ROM, or a CD-ROM or a storage device such as a hard disk incorporated into the computer system. The "computer-readable recording medium" includes a medium that holds a program for a predetermined time such as a volatile memory in a computer system serving as a server or a client. The program may be for realizing some of the aforementioned functions or may be for realizing the aforementioned functions in combination with a program stored in advance in the computer system. The program may be stored in a predetermined server, and the program may be delivered (downloaded or the like) via a communication line in response to a request from another device.

While an embodiment of the present invention has been described above with reference to the drawings, a specific configuration of the present invention is not limited to the embodiment and includes design or the like without departing from the gist of the present invention.

REFERENCE SIGNS LIST

1 Display device
2 Camera
10 Information processing device
11 Image input unit
12 Image processing unit
13 Storage unit
14 Image output unit
15, 413 Display unit
16 Distance calculating unit
30 Information processing device
121 Viewer detecting unit
122 Viewpoint detecting unit
123 Viewing ratio calculating unit
124 Viewing result determining unit
125 Content updating unit
131 Content storage unit
132 Distance storage unit
133 Element data storage unit
134 Video memory
310, 410 First display control unit
311, 411 Identification unit
312, 412 Second display control unit

What is claimed is:

1. An information processing device comprising:
a first display control unit configured to display together first content and second content, which is different from the first content, in a display area of a display unit;
an identification unit configured to identify third content and fourth content on the basis of a viewing action for the first content and the second content; and
a second display control unit configured to display, in the display area, the third content as identified and the fourth content as identified,
wherein a degree of relevance between the third content and the fourth content is lower than a degree of relevance between the third content and the first content,
wherein a degree of relevance between the second content and the fourth content is lower than the degree of relevance between the third content and the first content.

2. The information processing device according to claim 1, wherein the identification unit is configured to identify a second content candidate out of a plurality of content candidates with a relation in which a degree of relevance between one of the second content and the third content and the second content candidate different from a first content candidate out of the plurality of content candidates is lower than a degree of relevance between the one content and the first content candidate as the fourth content.

3. The information processing device according to claim 1, wherein the identification unit identifies a fourth content candidate out of a plurality of content candidates with a relation in which a degree of relevance between the fourth content candidate different from a third content candidate out of the plurality of content candidates and the first content is higher than a degree of relevance between the third content candidate and the first content as the third content.

4. The information processing device according to claim 1, further comprising:
a first determination unit configured to determine which of the first content and the second content is superior on the basis of the viewing action,
wherein the identification unit identifies content with a higher degree of relevance with the content determined to be superior as the third content.

5. The information processing device according to claim 4, wherein the first determination unit determines content with a longer cumulative time as superior content on the basis of a first cumulative time in which the first content has been viewed in a content display period and a second cumulative time in which the second content has been viewed.

6. The information processing device according to claim 4, wherein the first determination unit determines which content is superior on the basis of the number of times the first content has been viewed in the content display period and the number of times the second content has been viewed.

7. The information processing device according to claim 4, wherein, when it is determined that one of the first content and the second content is superior, the identification unit excludes the first content and the second content having been displayed from content candidates, identifies content with a higher degree of relevance with the content determined to be superior as the third content, and identifies content with a lower degree of relevance with the third content as the fourth content.

8. The information processing device according to claim 1, further comprising:
a second determination unit configured to determine whether a viewer is interested in the first content and the second content on the basis of the viewing action,
wherein the identification unit identifies the third content and the fourth content out of a plurality of content candidates except the content determined not to be interesting.

9. The information processing device according to claim 1, wherein the first display control unit displays a sixth content candidate out of a plurality of content candidates with a relation in which a degree of relevance between the sixth content candidate different from a fifth content candidate out of the plurality of content candidates and the first content is lower than a degree of relevance between the fifth content candidate and the first content candidate as the second content in the display area.

10. An information processing method comprising:
displaying together first content and second content, which is different from the first content, together, in a display area of the display unit;
identifying third content and fourth content on the basis of a viewing action for the first content and the second content; and
displaying, in the display area, the third content as identified and the fourth content as identified,
wherein a degree of relevance between the third content and the fourth content is lower than a degree of relevance between the third content and the first content, and
wherein a degree of relevance between the second content and the fourth content is lower than the degree of relevance between the third content and the first content.

11. An information processing device comprising:
a first display control unit configured to display together first content and second content, which is different from the first content, in a display area of a display unit;
a viewing result determining unit configured to determine a viewing action on the basis of viewing ratios of the first content and the second content and to determine which of the first content and the second content is superior on the basis of the viewing action determined;
an identification unit configured to identify third content and fourth content on the basis of the viewing action; and
a second display control unit configured to display, in the display area, the third content as identified and the fourth content as identified,
wherein a degree of relevance between the third content and the fourth content is lower than a degree of relevance between the third content and the first content.

* * * * *